United States Patent
Narayan et al.

(10) Patent No.: US 11,386,072 B1
(45) Date of Patent: Jul. 12, 2022

(54) AUTOMATIC CONSISTENCY FOR DATABASE WRITE FORWARDING

(71) Applicant: Amazon Technologies, Inc., Seattle, WA (US)

(72) Inventors: Saraswathy Narayan, Fremont, CA (US); Gopi Krishna Attaluri, Cupertino, CA (US); Dhruva Ranjan Chakrabarti, San Jose, CA (US); Atrayee Mullick, Cupertino, CA (US); Damien Katz, Alameda, CA (US); Alexandre Olegovich Verbitski, Woodinville, WA (US); Tengiz Kharatishvili, Issaquah, WA (US); Yingjie He, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 16/870,772

(22) Filed: May 8, 2020

(51) Int. Cl.
*G06F 16/23* (2019.01)
*G06F 16/27* (2019.01)

(52) U.S. Cl.
CPC ........ *G06F 16/2365* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 5,687,363 A | 11/1997 | Oulid-Aissa | |
| 7,177,866 B2 | 2/2007 | Holenstein | |
| 7,917,693 B2 | 3/2011 | Kazar et al. | |
| 8,874,609 B1 | 10/2014 | Singh et al. | |
| 9,507,843 B1* | 11/2016 | Madhavarapu | G06F 16/2358 |
| 9,984,140 B1* | 5/2018 | Sukumaran | G06F 16/27 |
| 2005/0234936 A1 | 10/2005 | Castro | |
| 2007/0118559 A1 | 5/2007 | Christiansen | |
| 2012/0054158 A1* | 3/2012 | Hu | G06F 16/1748 707/769 |
| 2014/0380007 A1* | 12/2014 | Suen | G06F 3/0659 711/162 |
| 2017/0017692 A1* | 1/2017 | Das | H04L 67/10 |
| 2017/0091226 A1* | 3/2017 | Kharatishvili | G06F 16/2228 |

OTHER PUBLICATIONS

U.S. Appl. No. 16/870,824, filed May 8, 2020, Dhruva Ranjan Chakrabarti, et al.
U.S. Appl. No. 16/870,825, filed May 8, 2020, Dhruva Ranjan Chakrabarti, et al.
"What is a Thread?" The Java Tutorial, https://www.liitk.ac.in/esc101/05Aug/tutorial/essential/thr4eads/definition.html, 2005, pp. 1-2.
"Difference between a proess and a thread", https://www.tutorialspoint.com/difference-between-pracess-and-thread, 2018 pp. 1-2.

* cited by examiner

*Primary Examiner* — Irene Baker
(74) *Attorney, Agent, or Firm* — Robert C. Kowert; Kowert, Hood, Munyon, Rankin & Goetzel, P.C.

(57) ABSTRACT

Automatic consistency is implemented for forwarding writes in a database system. A read-only node may support both read and write requests to a database. The read only node may forward write requests to a read-write node. The read-only node may determine whether to include the forwarded requests in a version of the database for a read request automatically according to a consistency specified for a read request.

20 Claims, 10 Drawing Sheets

AUTOMATIC CONSISTENCY FOR DATABASE WRITE FORWARDING

BACKGROUND

Database systems support various kinds of systems, services, and applications. Efficient utilization of a database can include fully leveraging the capabilities of each database system component in order to provide fast and efficient database system operations. In turn, fast and efficient database system operations can improve the performance of the systems, services, or applications that rely upon the database.

Figure 1:
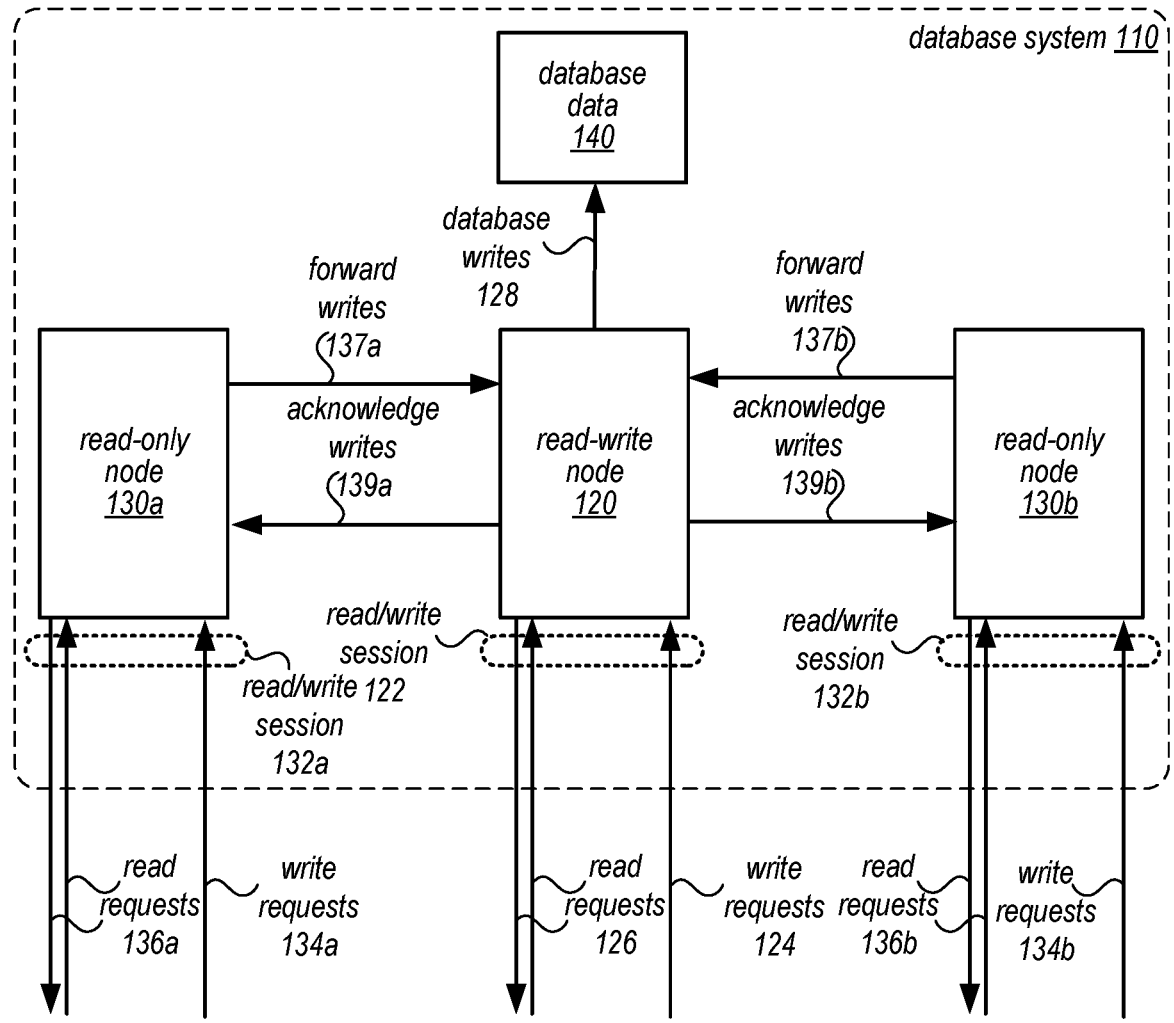
FIG. 1 is a logical block diagram automatic consistency for database write forwarding, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for automatic consistency for database write forwarding are described herein. In various embodiments, database systems may divide the workload for performing different requests between different database system components. For example, a database system may implement multiple nodes to serve requests for the database, such as requests that perform reads to a database and writes to the database, and nodes that perform reads alone. In this way, a database system can maintain consistency for the database by implementing a single writer to the database, while allowing for other portions of the workload to be distributed to read-only nodes. However, in order to take advantage of this division, client services, systems, or applications of the database may have to divide up their workload to ensure that requests are sent to the component (e.g., the read-only node or read-write node) that can support the desired request (e.g., writes may be to the read-write node, but reads can go to either).

In various embodiments, automatic consistency for database write forwarding may be implemented to remove the burden of dividing up workloads between different node types. For example, automatic consistency for database write forwarding may allow read-only nodes to support both read and write requests, similar to a read-only node. Instead of sacrificing consistency, automated consistency techniques may be applied to utilize the write capabilities of the read-write node to handle writes while still presenting a consistent view of the database at a read-only node that initially received the write request. In this way, automatic consistency can improve the performance of client systems, services, and applications because workloads do not have to be divided by type. Instead, workloads can be directed to database system nodes as needed (e.g., read-only nodes can be added to a database system to expand the read and write processing capacity for a client service, system, or application. Moreover, greater utilization of read-only nodes can be realized by a database system, leading to increased performance of a database system overall.

FIG. 1 is a logical block diagram automatic consistency for database write forwarding, according to some embodiments. Database system 110 may be a database system implemented using multiple different nodes, such as read-only nodes 130a and 130b and read-write node 120, to access data stored in a database on behalf of client systems, services, or applications, such as database data 140. Database system 110 can be various types of database system that implement read-only and read-write nodes, including various types of relational, non-relational, or other types of database (e.g., graph, time-series, etc.) that offer different consistency levels that can be automatically managed for read requests when forwarding write requests.

Read-write node 120 may accept both read requests 126 (e.g., queries, gets, scans, or other requests that cause a read of database 140) and write requests 124 (e.g., insert, update, delete, put, store, modify, or other requests that cause a write). The requests may be submitted via a read/write session 122 that supports both types of requests and is established with a client service, system, or application of database system 110. Read write node 120 may be capable of performing both read requests 126 and write requests 124. For example, as illustrated in FIG. 1, read-write node 120 may be able to perform database writes 128 to database data 140.

Database system 110 may also implement read-only nodes, such as read-only nodes 130a and 130b. Read-only nodes 130a and 130b may be able to perform read requests 136a by accessing a local copy, cache or replica of database data 140. In some embodiments, as discussed below with regard to FIGS. 2 and 3, database data 140 may be stored in shared storage that may be accessible for reads by read-only nodes 130 directly (if not for writes). To increase utilization of read-only nodes 130 and remove the burden of dividing client system, service, or applications between the different types of nodes, read-only nodes 130 support read-write sessions, such as read/write sessions 132a and 132b, to allow for both read requests, such as read requests 136a and 136b and write requests 134a and 134b, to be submitted to read-only nodes 130. For those requests that cannot be performed by the read-only node directly (e.g., write requests 134), read-only nodes may forward the writes, as indicated at 137a and 137b to read-write node 120. Read write node 120 may instead perform the writes on behalf of the read-only nodes 130 and send respective acknowledgements, as indicated 139a and 139b.

Because read-only nodes 130 are accepting writes, read-only nodes 130 may also support different types of consistency for reads in order to automatically determine what version of database data 140 to provide in response (e.g., what, if any, writes performed by a read-only node and/or other read-only nodes and/or the read-write node to include in the version of database data). As discussed in more detail below with regard to FIGS. 4-9, read-write node acknowledgements, updates, and other communications may be used to determine what version a read-only node may provide in response to a read request 136. Because such consistency is provided automatically, client applications do not have to account for enforcing consistency on the client-side. Instead, a client application can, in some embodiments, specify the consistency type and allow for read-only node 130 to provide data according to the specified type of consistency. In some embodiments, read-only nodes 130 can be able to forward read requests to read-write node 120 (e.g., when performed as part of a transaction, or when a read includes obtaining a lock on database data to be read).

Please note, FIG. 1 is provided as a logical illustration of database systems, storage, database data, read-only nodes, and read-write nodes, and is not intended to be limiting as to the physical arrangement, size, or number of components, modules, or devices to implement such features.

The specification first describes an example network-based database service that performs implements automatic consistency for database write forwarding. Included in the description of the example network-based database service are various aspects of the example network-based database service, such as a primary node, read replica node, and a separate storage service. The specification then describes flowcharts of various embodiments of methods for implements automatic consistency for database write forwarding. Next, the specification describes an example system that may implement the disclosed techniques. Various examples are provided throughout the specification.

Figure 2:
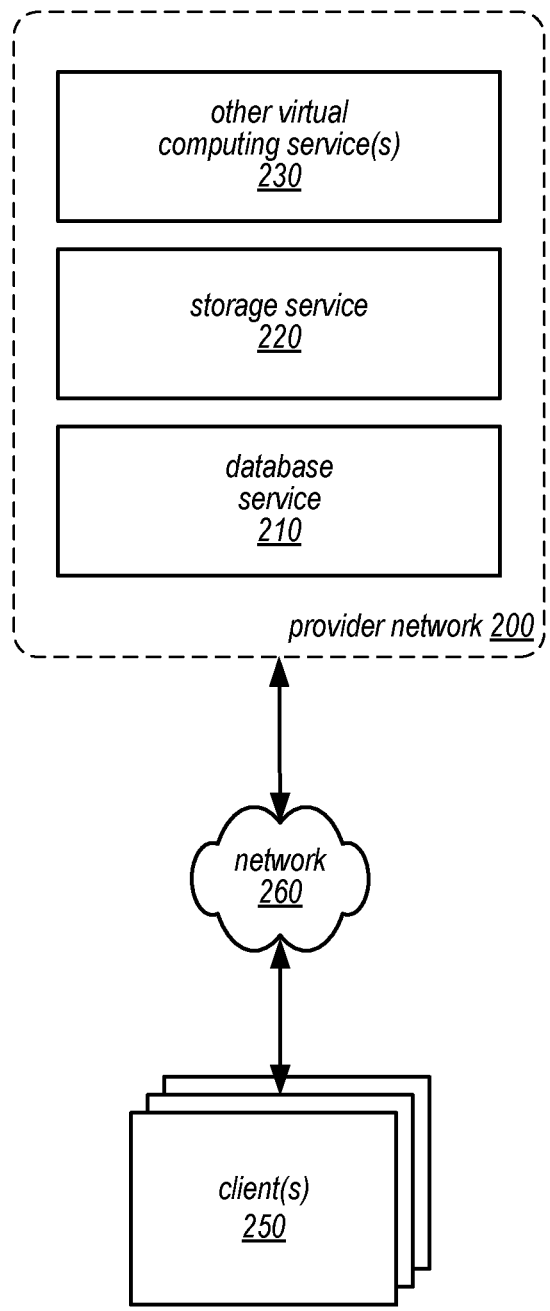
FIG. 2 is a block diagram illustrating a provider network that may implement a database service that implements automatic consistency for database write forwarding, according to some embodiments.

FIG. 2 is a block diagram illustrating a provider network that may implement a database service that implements automatic consistency for database write forwarding, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network within the provider network regions 200.

In the illustrated embodiment, a number of clients (shown as clients 250 may interact with a provider network 200 via a network 260. Provider network 200 may implement respective instantiations of the same (or different) services, a database services 210, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
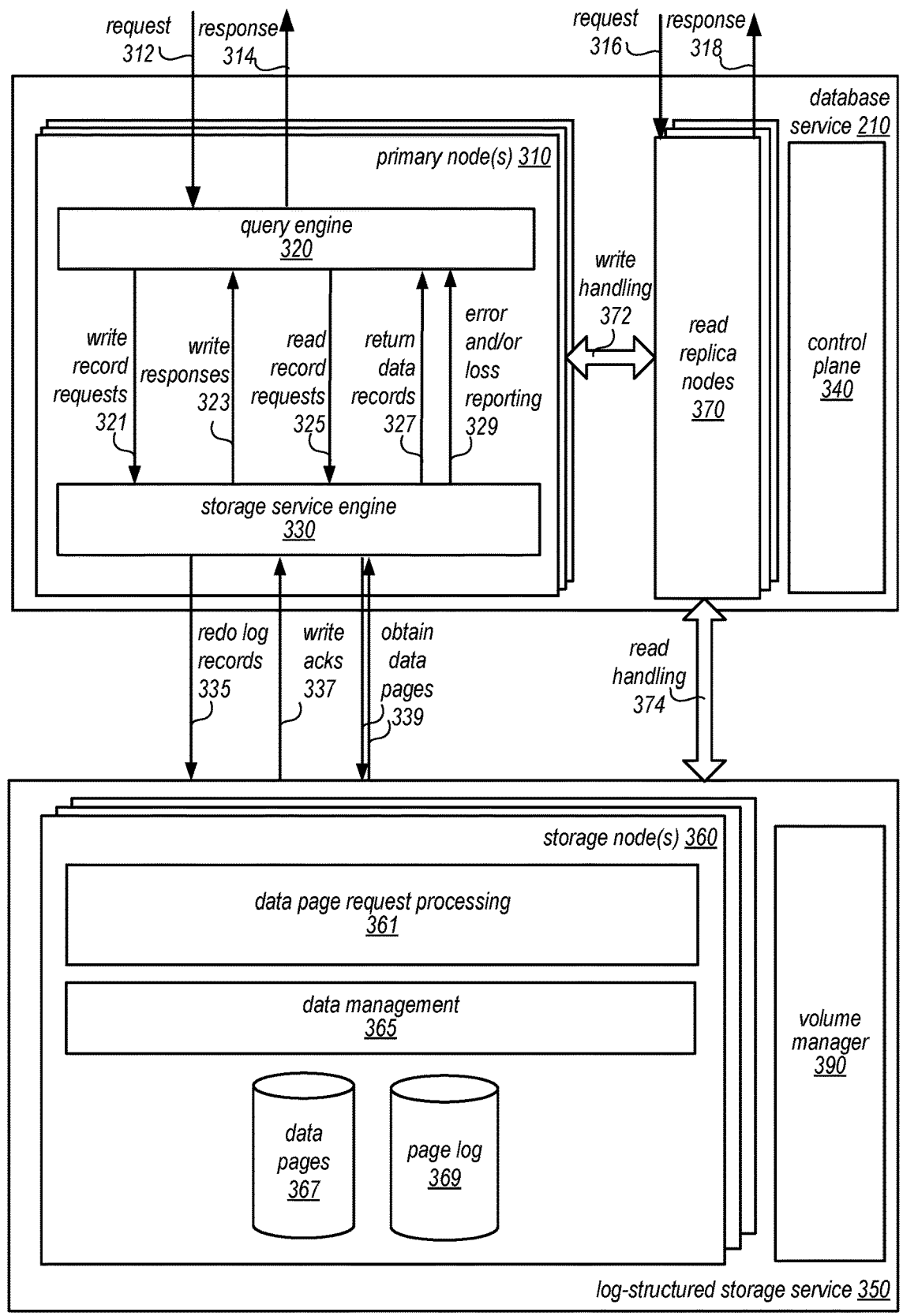
FIG. 3 is a block diagram illustrating various components of a database service and storage service that implement database write forwarding, according to some embodiments.

FIG. 3 is a block diagram illustrating various components of a database service and storage service that implement database write forwarding, according to some embodiments. Database service 210 may implement control plane 340 which may manage the creation, provisioning, deletion, or other features of managing a database hosted in database service 210. For example, as discussed below with regard to FIG. 4, control plane 340 may create a clone of a database in response to a request, in some embodiments.

Database service 210 may implement one or more different types of database systems with respective types of query engines for accessing database data as part of the database. In the example database system implemented as part of database service 210, a primary node 310 may be implemented for each of several databases and a log-structured storage service 350 (which may or may not be visible to the clients of the database system). Clients of a database may access a primary node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a primary node 310.

As previously noted, a database instance may include a primary node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, primary node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at primary node 310 (not illustrated) may manage a data page cache, in which data pages that were recently accessed may be temporarily held. Query engine 320 may be responsible for providing transactionality and consistency in the database instance of which primary node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to primary node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to primary node 310 (specifically to storage service engine 330). Storage service engine 330 may send the returned data pages to query engine 320 as return data records 327, and query engine may then evaluate the content of the data pages in order to determine or generate a result of a query sent as a response 314.

In some embodiments, various error and/or data loss messages 341 may be sent from log-structured storage service 350 to primary node 310 (specifically to storage service engine 330). These messages may be passed from storage service engine 330 to query engine 320 as error and/or loss reporting messages 329, and then to one or more clients as a response 314.

In some embodiments, the APIs 335-3339 of log-structured storage service 350 and the APIs 321-329 of storage service engine 330 may expose the functionality of the log-structured storage service 350 to primary node 310 as if primary node 310 were a client of log-structured storage service 350. For example, primary node 310 (through storage service engine 330) may write redo log records or request data pages through these APIs to perform (or facilitate the performance of) various operations of the database system implemented by the combination of primary node 310 and log-structured storage service 350 (e.g., storage, access, change logging, recovery, and/or space management operations).

Note that in various embodiments, the API calls and responses between primary node 310 and log-structured storage service 350 (e.g., APIs 321-329) and/or the API calls and responses between storage service engine 330 and query engine 320 (e.g., APIs 335-339) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with primary node 310 and/or log-structured storage service 350.

Database service 210 may also implement read replica nodes 370 for a database hosted by database service 210. Read replica nodes 370 may implement similar components to those of primary nodes 310, such as a query engine and storage service engine, which may be used to handle respective requests 316 and responses 318 received at a read replica. As discussed above with regard to FIG. 1 and below with regard to FIGS. 4-9, these read replicas, which may be a read-only node, may support both read and write requests to a database. Write handling 372 may be performed utilizing a primary node 310, as discussed in detail below. Read handling 374 may be performed by accessing local database caches or replicated data, which may be updated from updates received from primary node(s) 310 and/or by reading data from log-structured storage service, in some embodiments.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, as discussed in detail with regard to FIGS. 4 and 5, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In various embodiments, write forwarding for read-only nodes may be enabled or disabled for a database by a request (e.g., via an API, console, command line interface). In some embodiments, an active database may be changed to allow for write forwarding, while in other embodiments write forwarding may be enabled (or not selected, at the time of database creation. If write forwarding is not enabled, then a write request may be met with an error response or other indication that the write request is not supported when received at a read replica, in some embodiments.

Figure 4:
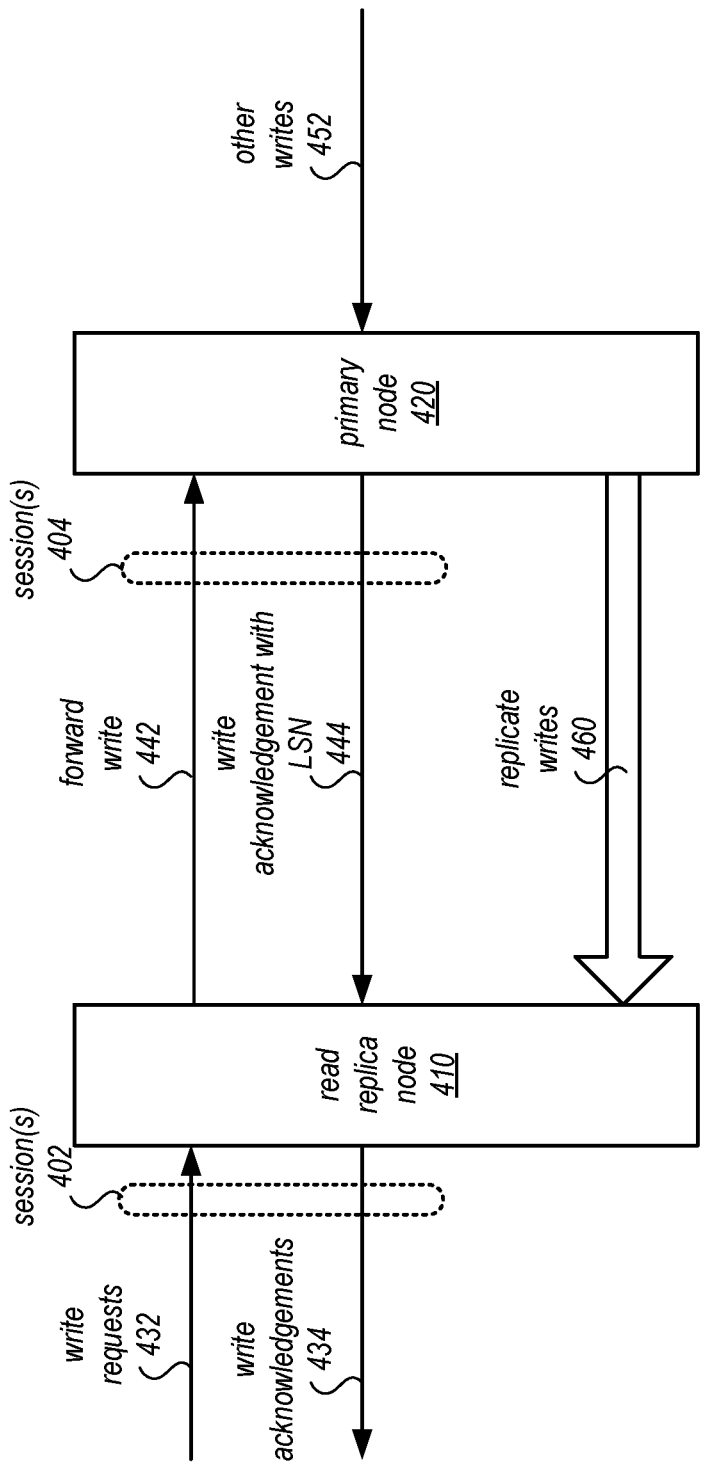
FIG. 4 is a block diagram illustrating interactions to perform a database write, according to some embodiments.

FIG. 4 is a block diagram illustrating interactions to perform a database write, according to some embodiments. For example, read replica node 410 may receive write requests 432 via session(s) 402 established with one (or more) clients. Read replica node 410 may identify the write requests when received and forward them, as indicated at 442, through a separate session 404 established between read replica node 410 and primary node 420. For example, when an initial write request 432 is received via a session 402, read replica node 410 may first establish session 404 to support read replica submitting write requests to the database (e.g., similar to a client application session established with primary node 420).

Primary node 420 may return acknowledgements 444 to forwarded writes when performed (or failure indications). As indicated at 444, the acknowledgement may include a Logical Sequence Number (LSN) which may indicate the state or version of the database that includes the write request, which may be used to determine what version of a database should be provided for a read request at the read replica node, as discussed below with regard to FIGS. 5-9. Read replica node 410 may then provide a write acknowledgement 434 back to a client.

In addition to receiving writes from read replica 410, primary node 420 may also receive other writes 452, from a client application that has a session with primary node 420 or other read replicas that may also be implemented and forwarding writes. To keep the replica (or replicated portion) of the database at read replica node 410 up to date, primary node 420 may provide a stream of replicated writes 460 to update the database data at read replica node 410. For example, both writes forwarded, such as write 442, and other writes 452, may be included in replicated writes 460. In this way, read replica node 410 does not have to apply writes when an acknowledgment is received at 444, but instead receives them in an update stream of replicated writes 460. The LSN values of replicated writes 460 may be included when replicated, in some embodiments.

Figure 5:
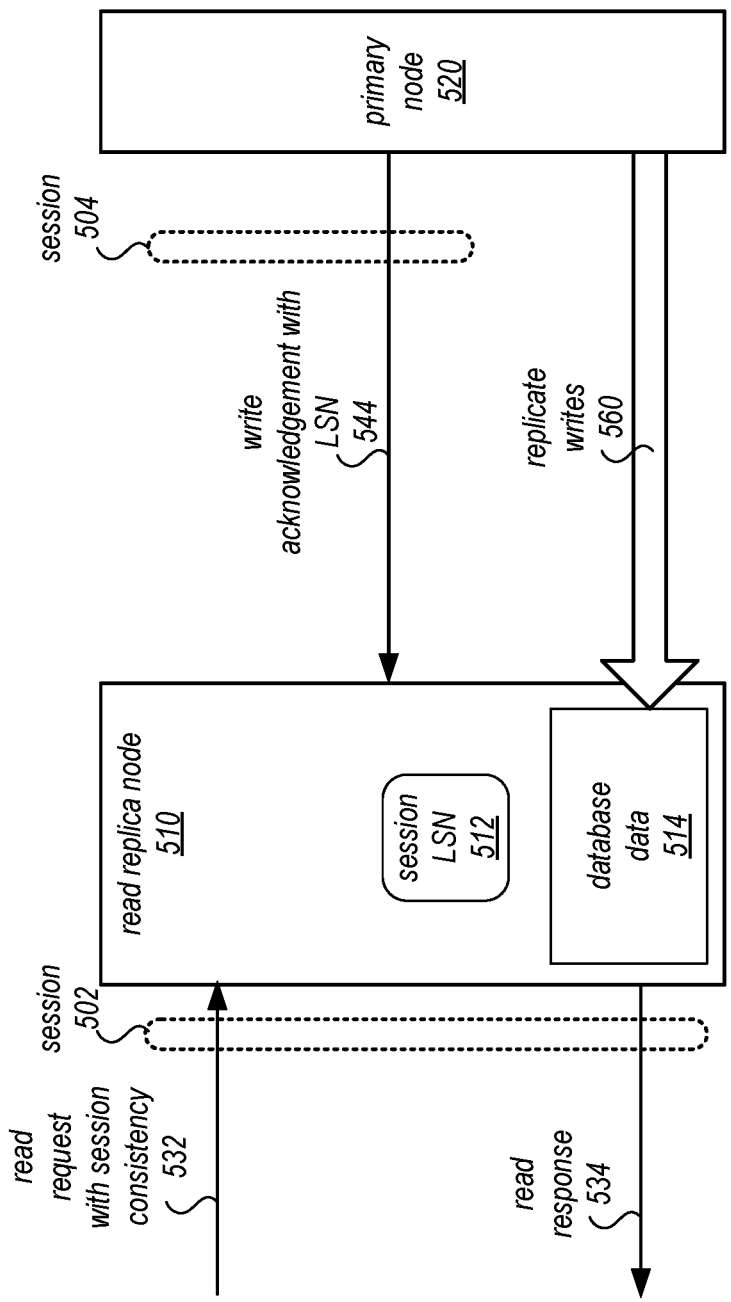
FIG. 5 is a logical block diagram illustrating interactions to provide session consistency for a database, according to some embodiments.

As a read replica node can be receiving both reads and writes, a read replica node may automatically apply techniques to determine a version of the database to provide for a read request according to a type of consistency specified for the read request (e.g., as part of the request via a parameter, as part of a session setting or parameter, an API invoking the request, or some other information that specifies the consistency level for a read request). In some embodiments, one consistency type may be eventual consistency, providing the version of the database that is accessible to the read-replica node when the read is received (e.g., without waiting to see if a previously received write request should be included), which may be an implicit determination that a write request received before the read request may not (or does not have to) be included in a version of the database used to provide the response. Various other types of consistency may also be specified for read requests. FIG. 5 is a logical block diagram illustrating interactions to provide session consistency for a database, according to some embodiments.

As indicated at 532, a read request may be received at read replica 510 via session 502 with session consistency specified, in some embodiments. Session consistency may allow for a read to be guaranteed to see any prior writes that completed successfully in the same session, such as any writes received via session 502 at read replica node 510, in some embodiments. To provide session consistency, read replica node 510 may determine a session LSN 512 that represents the last received LSN with a write acknowledgement, such as write acknowledgement 544 with an LSN received via session 504 from primary node 520 for a most recently performed write prior to read request 532, in some embodiments.

Read replica node 510 may wait to provide a response 534 to read request 532 until the update stream of replicated rates 560 includes the write described by session LSN. In this way, database data 514 may be updated to include that write 544 so that it is visible to read request 532.

Figure 6:
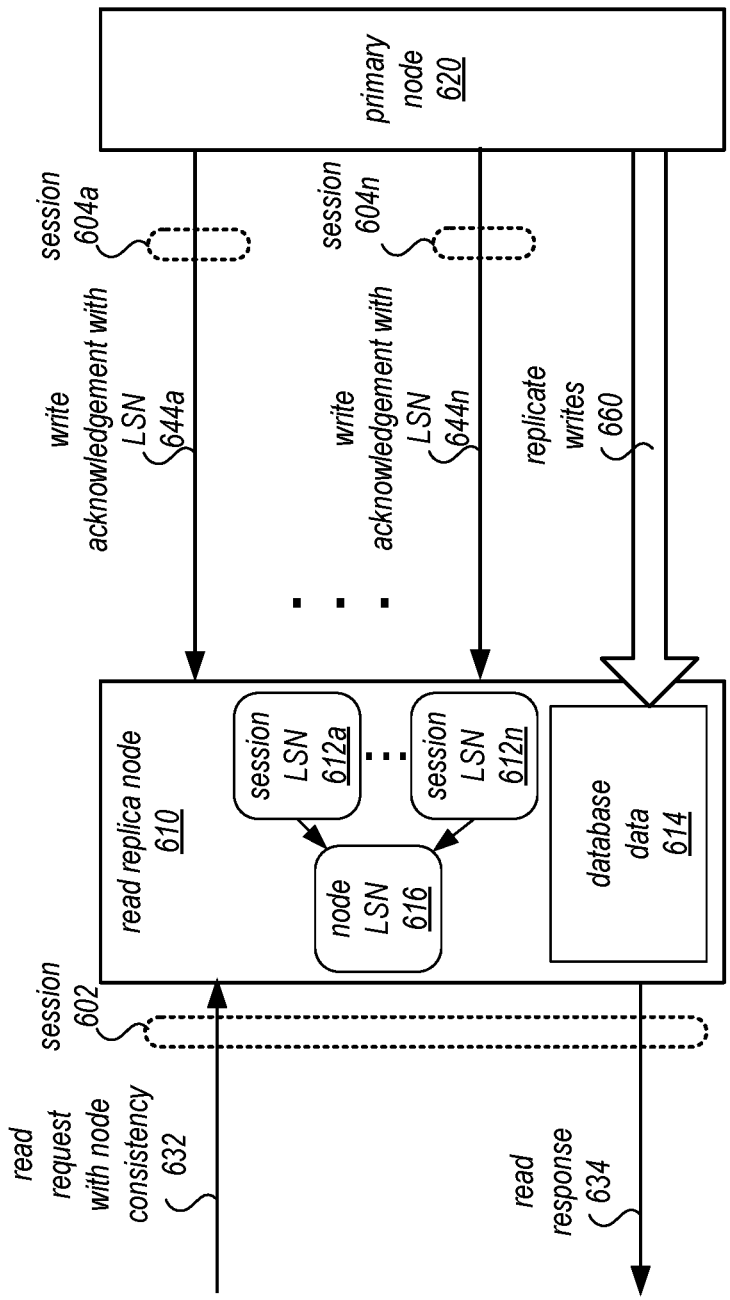
FIG. 6 is a logical block diagram illustrating interactions to provide node consistency for a database, according to some embodiments.

In addition to eventual consistency and session consistency, other consistency types may offer guarantees that include writes received prior to a read at wider scopes. For example, FIG. 6 is a logical block diagram illustrating interactions to provide node consistency for a database, according to some embodiments. Node consistency may, in various embodiments, provide a guarantee to a read request to have access to any data changed by any write request received at the same node prior to the read request, in various embodiments. For example, in FIG. 6, read replica node 610 may receive a read request with node consistency specified via session 602, as indicated at 602. Read replica node 602 may have multiple different sessions with different clients other than session 602.

Node consistency may include writes performed by those other clients and sessions in the version of the database read for read request 632. For instance, respective write acknowledgements 644a through 644n, received via respective sessions 604a through 604n for respective writes may be received. As indicated at 644, each acknowledgement may include an LSN. The latest LSN for each session may be used to update that session's session LSN value, such as session LSN 612a through 612n. To determine the LSN value that incorporates all prior writes to the node, node LSN 616 may be determined by taking the highest session LSNs 612 as node LSN 616, in some embodiments, when read request with node consistency 632 is received. Read replica node 610 may then wait until replicated writes 660 includes the write indicated by node LSN 616, apply the write to database data 614, and then use database data 614 to return a read response 634.

Figure 7:
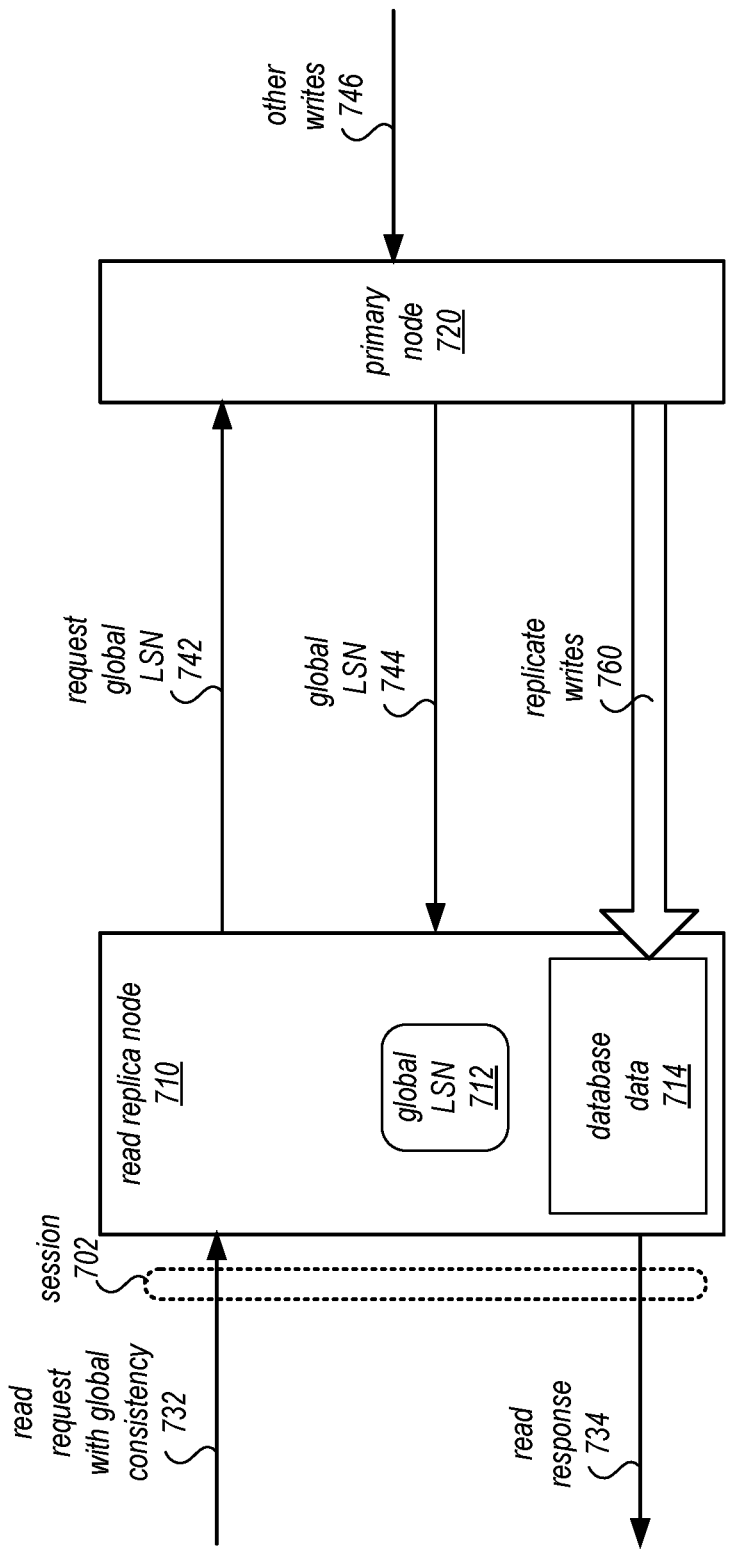
FIG. 7 is a logical block diagram illustrating interactions to provide global consistency for a database, according to some embodiments.

For use cases where a read-replica should be consistent across all nodes of the database, then global consistency may be determined. FIG. 7 is a logical block diagram illustrating interactions to provide global consistency for a database, according to some embodiments. Read request 732 may be received via session 702 at read replica node 710 with global consistency specified. Read replica node 710 may then send a request for the global LSN 742 to primary node 720. Primary node 720 may return 744 as the global LSN the highest committed LSN for the database across all requests submitted by all nodes and clients of primary node 720. Read replica node 710 may then wait until global LSN 712 is included in the replicated stream of writes 760 from primary node, apply the write to database data 714, and then access database data 714 to perform the read request and send read response 734.

Figure 8:
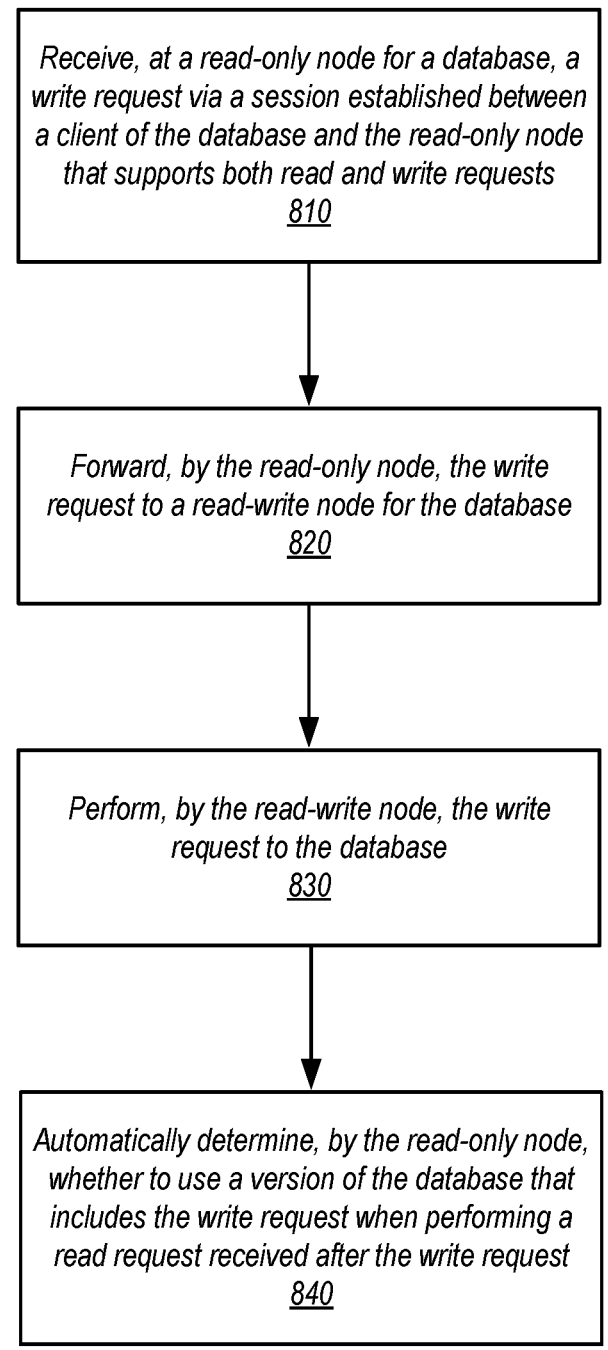
FIG. 8 is a high-level flowchart illustrating various methods and techniques to implement automatic consistency for database write forwarding, according to some embodiments.

The database service and storage service discussed in FIGS. 2 through 7 provide examples of a database system that may implement automatic consistency for database write forwarding. However, various other types of database systems may implement automatic consistency for database write forwarding. FIG. 8 is a high-level flowchart illustrating various methods and techniques to implement automatic consistency for database write forwarding, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 810, a write request may be received at a read-only node for a database via a session established between a client of the database and the read-only node that supports both read and write requests, in some embodiments. As indicated at 820, the write request may be forwarded by the read-only node to the read-write node of the database, in some embodiments. If write forwarding is not enabled for the read-only node, the write request may be rejected (e.g., an error response sent). As indicated at 830, the write request may be performed by the read-write node to the database, in some embodiments. For example, the update, delete, insert, store, put, or other modification to the database may be performed.

As indicated at 840, the read-only node may automatically determine whether to user a version of the database that includes the write request when performing a read request received after the write request, in some embodiments. For example, a default consistency may be provided and the version of the database determined according to the default consistency. Various types of consistencies may be specified for read requests, which may be used to automatically determine whether to include the write request, as discussed in detail below with regard to FIG. 9. In some embodiments, write requests received after the read request in some types of consistency may be included in the version of the database. For example, a write request received via another session on the read-only node, at the read-write node, and/or at another read-only node may be received after the read request, in some embodiments.

Figure 9:
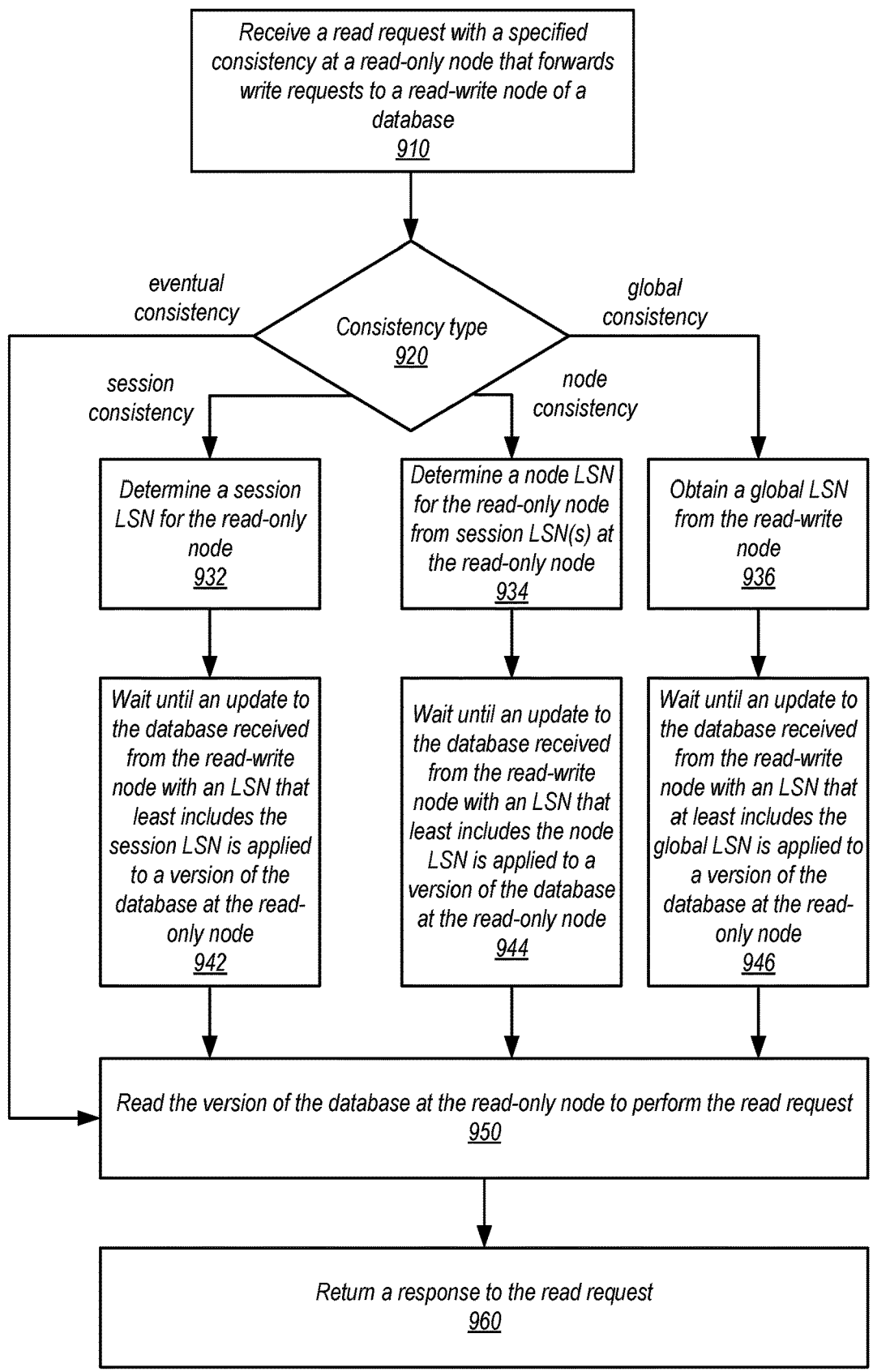
FIG. 9 is a high-level flowchart illustrating various methods and techniques to implement consistency types for handling reads, according to some embodiments.

FIG. 9 is a high-level flowchart illustrating various methods and techniques to implement consistency types for handling reads, according to some embodiments. As indicated at 910, a read request may be received with a specified consistency at a read-only node that forwards write requests to a read-write node of a database, in some embodiments. As indicated by the various exits from element 920, different types of consistency may be handled in different ways.

For eventual consistency, writes prior to a read request do not have to be included in the version read for the read response as long as they are eventually included in the database, in some embodiments. Therefore, for eventual consistent types of read requests, the version of the database at the read-only node when the read request is received may be read to perform the read request, as indicated at 950. A response to the read request may then be returned, as indicated at 960.

For session consistency, a session LSN may be determined for the read-only node, as indicated at 932, in various embodiments. For example, the latest LSN value returned for a write request from a read-write node that is received via the same session prior to the read request may be the session LSN. As indicated at 942, the read-only node may wait until an update to the database received from the read-write node with an LSN that at least includes the session LSN is applied to a version of the database at the read-only node, in some embodiments. Then, this updated version of the database at the read-only node when the read request may be read to perform the read request, as indicated at 950. A response to the read request may then be returned, as indicated at 960.

For node consistency, a node LSN may be determined for the read-only node, as indicated at 934, from session LSN(s) (determined as discussed above) in various embodiments. For example, the latest session LSN value for each open session at the read-only node that is returned for a write request from a read-write node prior to the read request may be the various session LSNs. The highest LSN value of the session LSNs may be chosen as the node LSN. As indicated at 944, the read-only node may wait until an update to the database received from the read-write node with an LSN that at least includes the node LSN is applied to a version of the database at the read-only node, in some embodiments. Then, this updated version of the database at the read-only node when the read request may be read to perform the read request, as indicated at 950. A response to the read request may then be returned, as indicated at 960.

For global consistency, a global LSN may be obtained from the read-write node, as indicated at 936, in various embodiments. For example, the latest committed LSN value across client submitted or read-only node submitted requests may be the global LSN. As indicated at 946, the read-only node may wait until an update to the database received from the read-write node with an LSN that at least includes the global LSN is applied to a version of the database at the read-only node, in some embodiments. Then, this updated version of the database at the read-only node when the read request may be read to perform the read request, as indicated at 950. A response to the read request may then be returned, as indicated at 960.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
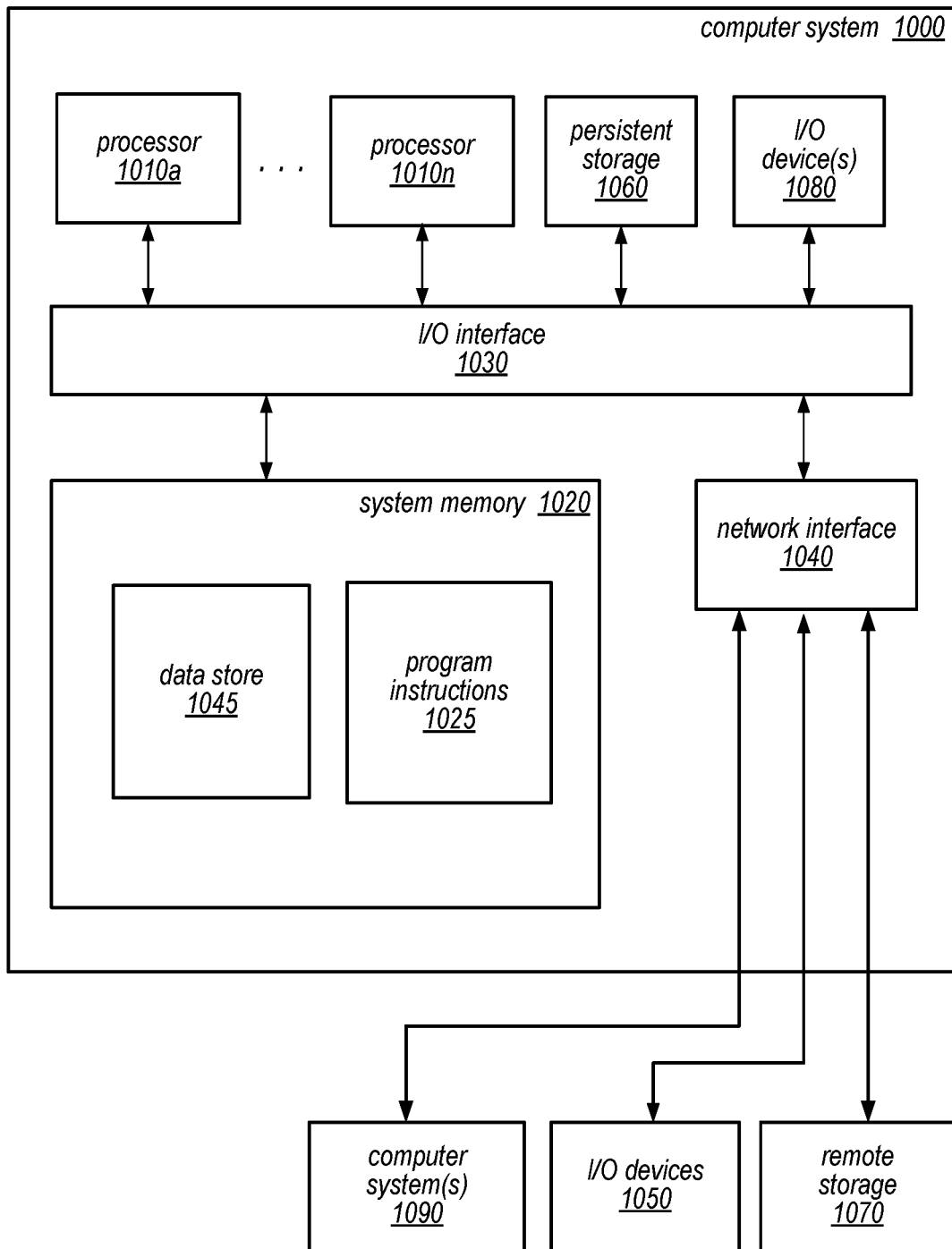
FIG. 10 is a block diagram illustrating an example computer system, according to various embodiments.

FIG. 10 is a block diagram illustrating an example computer system that may implement the techniques for automatic consistency for database write forwarding, according to various embodiments described herein. For example, computer system 1000 may implement a primary node and/or one of a plurality of storage nodes of a separate storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
  a plurality of nodes, respectively comprising at least one processor and a memory, that implement a database system;
  wherein one of the plurality of nodes implements a read replica node for the database system and another one of the plurality of nodes implements a primary node for the database system;
  wherein the read replica node is configured to:
    receive write request via a session established between a client of the database system and the read replica node that supports both read and write requests;
    send the write request to the primary node via another session established between the read replica and the primary node;
  wherein the primary node is configured to:
    perform the write request to database data;
    send an acknowledgement to the read replica node that the write request was performed;
  wherein the read replica node is further configured to:
    receive the acknowledgement from the read-write node that the write request to the database was performed; and
    automatically determine whether to use a version of the database that includes the write request when performing a read request received after the write request.

2. The system of claim 1, wherein to automatically determine whether to use the version of the database that includes the write request when performing a read request received after the write request, the read replica node is configured to:
  identify a session consistency specified for the read request;
  determine a session logical sequence number (LSN) for the read-only node; and
  wait until an update to the database received from the primary node that at least includes the session LSN is applied to the version of the database at the read only node.

3. The system of claim 1, wherein to automatically determine whether to use the version of the database that includes the write request received from the primary node when performing a read request received after the write request, the read replica node is configured to:
  identify a global consistency specified for the read request;
  obtain a global logical sequence number (LSN) from the primary node, wherein the acknowledgement of the write request received from the primary node is included within writes to the database data identified by the global LSN; and
  wait until an update to the database received from the primary node that at least includes the global LSN is applied to the version of the database at the read replica node.

4. The system of claim 1, wherein the database system is implemented as part of a database service offered by a provider network, wherein the database data is stored in a separate storage service of the provider network, and wherein the write request is sent to the primary node after receiving a request via an interface for the database service to enable write forwarding for the read replica node.

5. A method, comprising:
  receiving, at a read-only node for a database, a write request via a session established between a client of the database and the read-only node that supports both read and write requests;
  forwarding, by the read-only node, the write request to a read-write node for the database;
  performing, by the read-write node, the write request to the database; and
  automatically determining, by the read-only node, whether to use a version of the database that includes the write request when performing a read request received after the write request.

6. The method of claim 5, wherein the automatically determining whether to use the version of the database that includes the write request received from the read-write node when performing the read request received after the write request comprises:

identifying a session consistency specified for the read request;
determining a session logical sequence number (LSN) for the read-only node; and
waiting until an update to the database received from the read-write node that at least includes the session LSN is applied to the version of the database at the read-only node.

7. The method of claim 5, wherein the automatically determining whether to use the version of the database that includes the write request when performing the read request received after the write request comprises:
identifying an eventual consistency specified for the read request;
reading the version of the database at the read-only node when the read request is received.

8. The method of claim 5, wherein the version of the database that includes the write request is received as part of replicated writes from the read-write node.

9. The method of claim 5, further comprising:
receiving, at the read-only node, another write request;
forwarding, by the read-only node, the other write request to the read-write node;
responsive to receiving a failure for the other write request from the read-write node, sending, by the read-only node, a failure notification in response to the other write request.

10. The method of claim 5, wherein another read-only node forwards another write request received at the other read-only node to the read-write node to perform the other write request.

11. The method of claim 5, wherein the version of the database that includes the write request is received from a data storage system for the database.

12. The method of claim 5, wherein the automatically determining whether to use the version of the database that includes the write request received from the read-write node when performing the read request received after the write request comprises:
identifying a global consistency specified for the read request;
obtaining a global logical sequence number (LSN) from the read write node, wherein the acknowledgement of the write request received from the primary node is included within writes to the database data identified by the global LSN; and
waiting until an update to the database received from the primary node that at least includes the global LSN is applied to the version of the database at the read only node.

13. The method of claim 5, further comprising:
receiving a request to enable write forwarding for the database, wherein the forwarding of the write request is allowed after receiving the request to enable write forwarding.

14. One or more non-transitory, computer-readable storage media, storing program instructions that when executed on or across one or more computing devices cause the one or more computing devices to implement:
receiving, at a read-only node for a database, a write request via a session established between a client of the database and the read-only node that supports both read and write requests;
forwarding, by the read-only node, the write request to a read-write node for the database;

receiving, at the read-only node, an acknowledgement from the read-write node that the write request to the database was performed; and
automatically determining, by the read-only node, whether to use a version of the database that includes the write request when performing a read request received after the write request.

15. The one or more non-transitory, computer-readable storage media of claim 14, wherein, in automatically determining whether to use the version of the database that includes the write request received from the read-write node when performing the read request received after the write request, the program instructions cause the one or more computing devices to implement:
identifying a global consistency specified for the read request;
obtaining a global logical sequence number (LSN) from the read write node, wherein the acknowledgement of the write request received from the primary node is included within writes to the database data identified by the global LSN; and
waiting until an update to the database received from the primary node that at least includes the global LSN is applied to the version of the database at the read only node.

16. The one or more non-transitory, computer-readable storage media of claim 14, further comprising:
receiving, at the read-only node, another read request via the session;
forwarding, by the read-only node, the read request to the read-write node for the database; and
returning, by the read-only node, a response to the read request received from the read-only node.

17. The one or more non-transitory, computer-readable storage media of claim 14, storing further program instructions that when executed by the one or more computing devices cause the one or more computing devices to implement:
receiving, at the read-only node, another write request;
forwarding, by the read-only node, the other write request to the read-write node;
responsive to receiving a failure for the other write request from the read-write node, sending, by the read-only node, a failure notification in response to the other write request.

18. The one or more non-transitory, computer-readable storage media of claim 14, wherein, in automatically determining whether to use the version of the database that includes the write request received from the read-write node when performing the read request received after the write request, the program instructions cause the one or more computing devices to implement:
identifying a node consistency specified for the read request;
determining a node logical sequence number (LSN) for the read-only node from one or more session LSNs of the read-only node; and
waiting until an update to the database received from the primary node that at least includes the node LSN is applied to the version of the database at the read only node.

19. The one or more non-transitory, computer-readable storage media of claim 14, wherein, in automatically determining whether to use the version of the database that includes the write request received from the read-write node when performing the read request received after the write request, the program instructions cause the one or more computing devices to implement:
- identifying a session consistency specified for the read request;
- determining a session logical sequence number (LSN) for the read-only node; and
- waiting until an update to the database received from the primary node that at least includes the session LSN is applied to the version of the database at the read only node.

20. The one or more non-transitory, computer-readable storage media of claim 14, wherein the database is implemented as part of a database service offered by a provider network, and wherein the write request is sent to the read-write node after receiving a request via an interface for the database service to enable write forwarding for the read replica node.

* * * * *